Jan. 7, 1964 R. N. HARBISON 3,116,559
SEISMIC DIP PLOTTER AND MIGRATOR
Filed Aug. 10, 1960 4 Sheets-Sheet 1

Reginald N. Harbison
INVENTOR.

BY
Attorneys

Jan. 7, 1964  R. N. HARBISON  3,116,559
SEISMIC DIP PLOTTER AND MIGRATOR
Filed Aug. 10, 1960  4 Sheets-Sheet 2
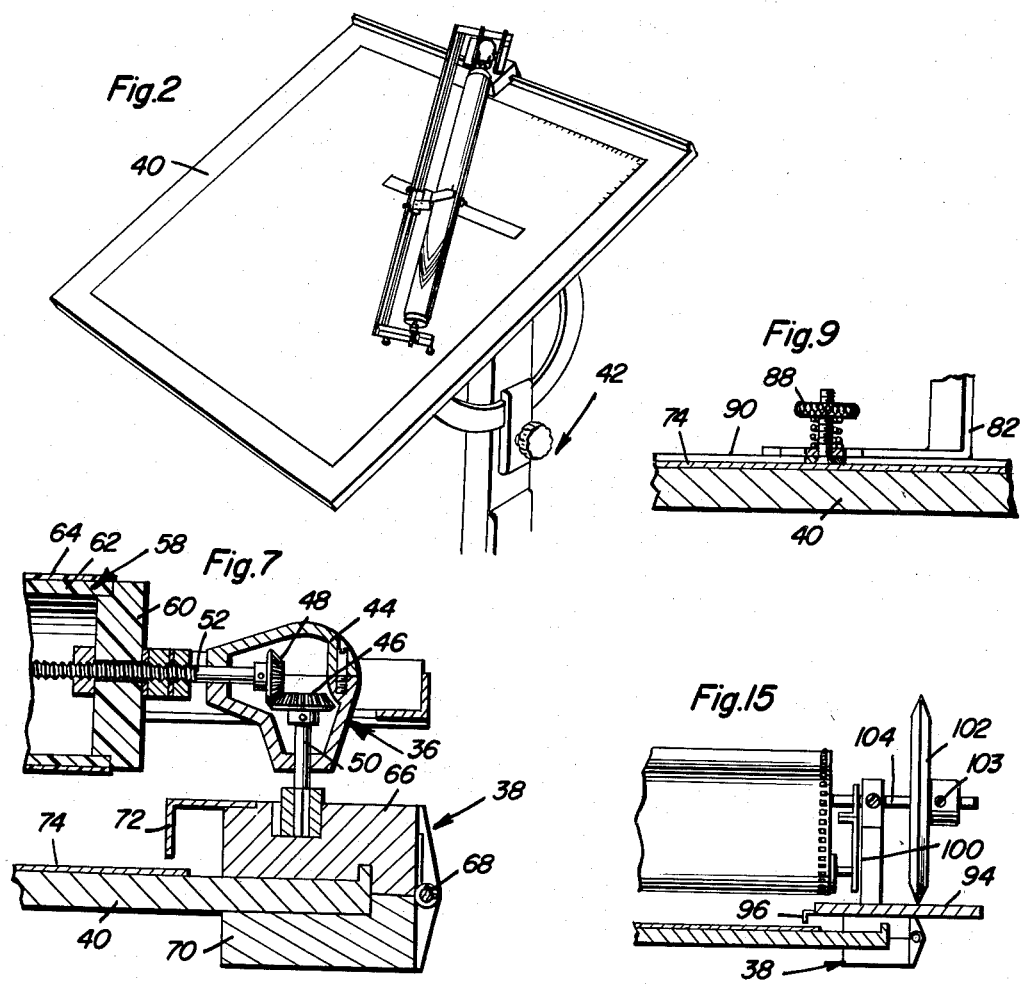
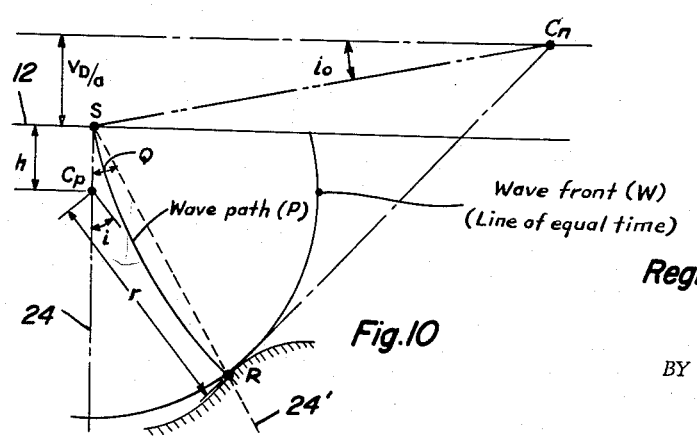
Reginald N. Harbison
INVENTOR.

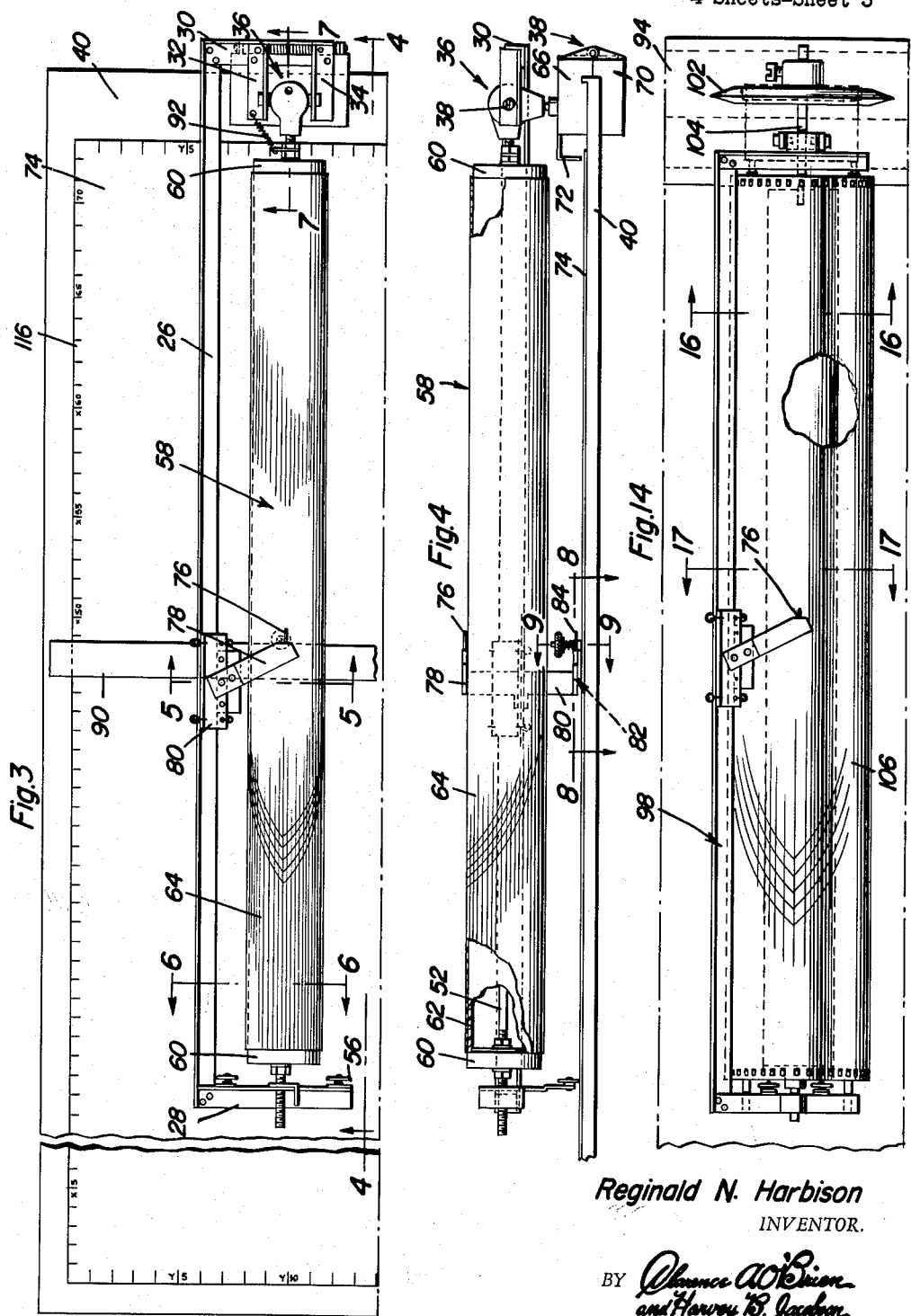

Jan. 7, 1964 R. N. HARBISON 3,116,559
SEISMIC DIP PLOTTER AND MIGRATOR
Filed Aug. 10, 1960 4 Sheets-Sheet 4

*Reginald N. Harbison*
INVENTOR.

BY
Attorneys

United States Patent Office 3,116,559
Patented Jan. 7, 1964

3,116,559
SEISMIC DIP PLOTTER AND MIGRATOR
Reginald N. Harbison, Hebbronville, Tex.
(2515 S. Adams St., Arlington, Va.)
Filed Aug. 10, 1960, Ser. No. 48,625
11 Claims. (Cl. 33—76)

This invention relates to apparatus especially useful in conjunction with seismic explorations to determine the profiles of subsurface beds in prospecting for oil. The apparatus to which this invention relates therefore would enable the geologist conducting such seismic exploration to convert time measurement data directly into a plot of the subsurface bed profile.

It is therefore a primary object of this invention to provide a plotting mechanism which is so calibrated that time measurement data may be used to accurately and in a simple manner locate points on a plotting sheet which when interconnected constitute a subsurface bed profile corresponding to the time measurement data obtained.

The plotting mechanism of this invention therefore relates to the field of reflection seismography which is a system whereby an explosive charge is set off near the surface of the earth which sends sound energy downward into the earth. Some of the sound waves (using the terminology of the wave theory of energy transmission) are reflected back up to the surface of the earth by the layers of rock beneath the surface. Accordingly, a series of sound detectors or geophones are placed in a straight line across the location of the explosion which is referred to as a shot point, to pick up the reflected sound waves from the rock beds below. Time measurements are therefore taken in connection with the sound detectors so as to measure the time it takes from the beginning of the explosion until the reflected sound is picked up on the geophones, that time measurement being referred to as reflection time. This reflection time therefore includes both the time it takes the sound wave to travel from the shot point to a point on the reflecting rock bed referred to as a reflector plus the time it takes the reflected sound wave to return to the surface of the earth. Inasmuch as the reflection time is a function of the depth of the rock bed or reflector this time measurement may be converted into a depth or distance measurement of the reflector. Therefore, in order to determine a subsurface bed profile or a profile of the reflector surface, a series of shot points are placed in a straight line and time measurements taken with respect to each shot point so that the measurement data so obtained may be converted into a plot of the reflector surface profile. From the profile information so obtained the oil prospector may be in a position to analyze the subsurface rock bed formations in order to speculate whether or not the particular rock bed formation favors oil accumulation.

It will therefore be appreciated that a tremendous amount of seismic recordings must be obtained in order to amass sufficient data for obtaining a rock bed formation picture of sufficient extent for the prospector or geophysicist to be able to make a reliable analysis. Accordingly, the plotter mechanism of this invention is provided for the purpose of enabling both rapid and accurate conversion of the amassed reflection time measurement data into a subsurface rock bed profile plot.

It will be appreciated that in order to convert reflection time measurements into distance measurements in order to determine the depth of the reflector surface or rock bed, the speed with which the sound waves travel through the earth must be ascertained. The conversion problem would therefore be a simple one if the speed or velocity as hereinafter referred to of the sound waves were of a constant value. Such would occur however only if the medium through which the sound waves travel were of uniform and constant density. However, sound waves emanating from the shot point and traveling through the earth do not travel through a medium of uniform and constant density. Generally the density of the earth increases with the depth inasmuch as the top layers of the earth tend to compact the lower layers. Accordingly, the velocity of the sound waves as they travel downwardly through the earth increases inasmuch as the sound energy travels at a higher velocity through denser mediums. Another problem that complicates the conversion of the reflection time measurement data into profile plotting data involves the fact that the sound waves will be reflected by reflector surfaces which are closest to the shot point or source. Therefore, the closest reflector surface may not necessarily be directly below the shot point but may be displaced laterally therefrom with respect to a vertical line extending downwardly from the shot point. Such lateral displacement of the reflector surface is referred to as migration. Accordingly, the reflection time measurement not only reflects the depth of the reflector surface below the shot point but also its migrated displacement from the shot point. It is therefore an important object of this invention in converting the reflection time measurement into usable profile information of the reflector surface to take into account both the variable nature of the sound wave velocity and the migrated displacement of the reflector point for which the reflection time measurement is taken. The disadvantages of previous plotting mechanisms have therefore been overcome by the plotter apparatus made in accordance with this invention in that the use of an average or assumed velocity value need not be resorted to. Instead the actual variable velocity characteristics for sound waves traveling through the earth in the general area under exploration, may be utilized in calibrating the plotter apparatus so as to provide a more accurate conversion of the reflection time data.

The plotting apparatus in accordance with this invention therefore includes a scale that may be calibrated to take into account any desired variable velocity characteristic of the sound waves. The apparatus is further effective to plot both the depth of the reflector point, its migrated position below the shot point as well as the inclination of the reflector surface at said reflector point which inclination is referred to as "dip." Accordingly, by use of this apparatus an accurate reflector surface profile may be obtained.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a perspective view of one form of the plotting mechanism made in accordance with this invention.

FIGURE 3 is a top plan view of the plotter illustrated in FIGURE 2.

FIGURE 4 is a side elevational view with parts shown in section of the plotter illustrated in FIGURE 3.

FIGURE 7 is a sectional view taken through a plane indicated by section line 7—7 in FIGURE 3.

FIGURE 9 is a sectional view taken through a plane indicated by section line 9—9 in FIGURE 4.

FIGURE 10 is a diagram illustrating various geometrical relationships between a shot point and reflector point.

FIGURE 14 is a top plan view of another form of plotter apparatus.

FIGURE 15 is a partial side sectional view of the plotter apparatus illustrated in FIGURE 14.

Figure 1:
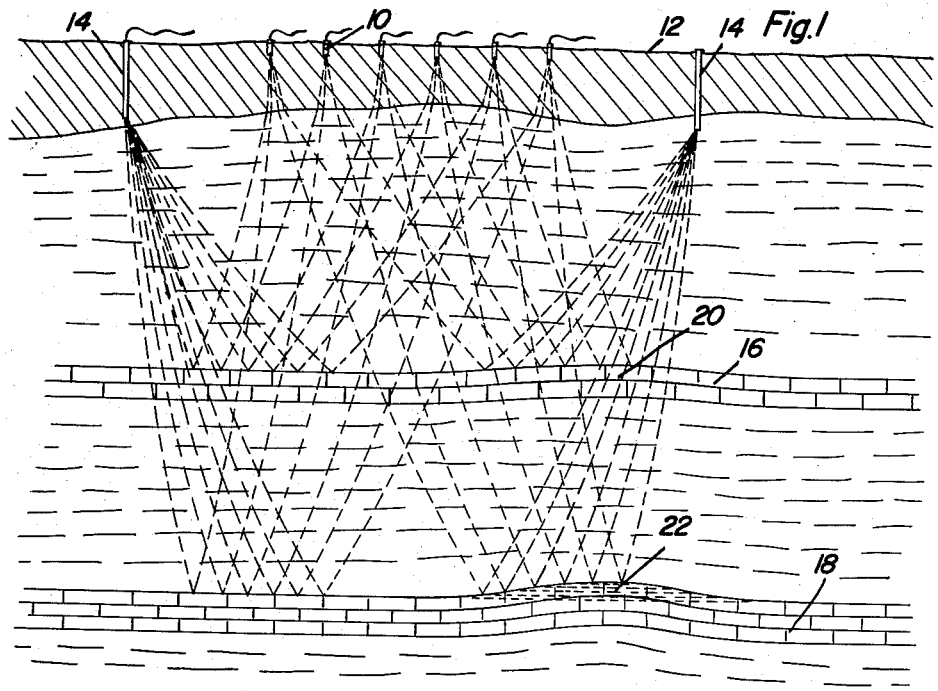
FIGURE 1 is a sectional view through the subsurface layers of the earth subjected to seismic exploration by means of a series of shot points.
Figure 5:
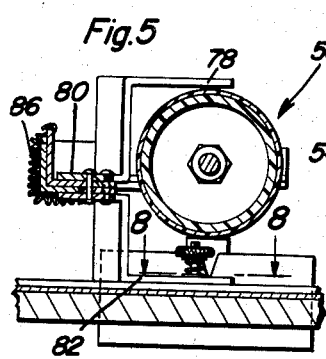
FIGURE 5 is a sectional view taken through a plane indicated by section line 5—5 in FIGURE 3.

Referring to the drawings in detail, FIGURE 1 generally indicates the method by which seismic exploration for oil is conducted. It will therefore be observed in FIGURE 1, that a series of explosive charges 14 are placed just below the surface 12 of the earth while seismic detectors 10 are placed therebetween in order to pick up or detect sound waves which are reflected from the reflecting bed surfaces 16 and 18 located beneath the earth surface. The dotted lines in FIGURE 1 therefore represent the wave paths or paths of travel of the sound energy downwardly through the earth to a point on the reflecting bed formations 16 and 18, said waves accordingly being reflected therefrom upwardly and toward the seismic detectors 10. It will therefore be appreciated that the reflection time recorded by the seismic detectors 10 represent the travel time from the exposive sound source 14 to the reflecting bed formations 16 or 18 plus the equal time of reflection. Accordingly, by setting off explosions at a series of points as illustrated in FIGURE 1 and converting the reflection time data so obtained by the seismic detectors 10, a profile picture may be obtained by use of the new and novel plotter mechanism which would show hump portions 20 and 22 in the profiles of bed formations 16 and 18. Upon analysis of such profile information the geophysicist may therefore speculate that the hump portions of the two profiles favor the accumulation of oil and will recommend the drilling of an oil well in vertical alignment with the hump portions 20 and 22 of the bed formations 16 and 18 as pictured by the profiles of the subsurface. Accordingly, the oil accumulation illustrated at 22 in FIGURE 1 would be tapped.

It will be observed that in FIGURE 1 the path of travel of the sound waves is illustrated by dotted lines which are of curved configuration. As was herein before indicated, the velocity of the sound waves through the earth is not uniform and constant. If such were the case, then the path of travel of the sound waves would be a straight line. Accordingly, if the velocity were constant the path from the shot point to a reflector point would be a straight line. However, where the medium increases in density with depth as in the case of the earth, the velocity of the sound wave traveling through the earth also increases as it travels from the shot point to the reflector point. Accordingly, the path of the sound wave in traveling from the source or shot point to the receiver or reflecting point will curve away from the straight line interconnecting the two points inasmuch as it must traverse the distance between the two points at an increasing velocity and hence the longer path between the two points resulting in the curvature. Accordingly, the curvature of the path between the shot point and reflector point will depend on the functional relationship between the sound wave velocity and the depth. If such functional relationship is a linear relationship, in other words, if the sound wave velocity increases at a constant rate with increase in depth, it can be shown that the curvature of the wave path is an arc of a circle and hence the curvature has a fixed center and a constant radius. For purposes of explanation only therefore the following description of the method for calibrating the scales to be used in the plotting apparatus will be based upon a velocity characteristic for the sound wave which is a linear function of the vertical depth below the earth surface. It will also be assumed that the medium through which the sound waves travel is isotropic, that is, its velocity has no lateral variations with respect to the medium. It should however be appreciated at this point that the plotting apparatus in accordance with this invention is not restricted to the use of a velocity characteristic which is a linear function of the vertical depth since the scale may be similarly calibrated in accordance with other velocity characteristics or velocity functions of depth.

Referring therefore to FIGURE 10, it will be observed that line 12 representing the surface of the earth has located thereon at point S the shot point from which the sound wave emanates. Also illustrated in FIGURE 10 is a reflecting surface on which there is a reflector point R. The reflector point R on the reflecting surface is therefore that point which is on the reflecting surface located at the shortest distance from the shot point S along the dotted line 24'. Accordingly, the sound wave emanating from the shot point source S will first contact point R and be reflected so that it may be detected by the seismic detector as previously explained. The reflection time will therefore be recorded and represents the spatial disposition of the point R relative to the shot point S. It will be observed in FIGURE 10, that the wave path P along which the sound wave travels is assumed to be circular in view of the exemplary assumption previously referred to that the velocity variation is a linear function of the vertical depth. The center of curvature of the wave path P is therefore located at point $Cn$. The location of the center of curvature $Cn$ can be determined or plotted by obtaining the value of the angle $i_0$ and the distance above the surface line 12 ($V_{D/a}$) as seen in FIGURE 10. $V_D$ represents the datum velocity of sound at sea level while $a$ represents the constant rate of change of the velocity with respect to depth. Accordingly, by obtaining the values of $V_D$ and $a$ as well as the magnitude of the angle $i_0$ the center of curvature $Cn$ may be located so that the wave path P may be plotted as indicated in FIGURE 10. The length of the arc formed by the wave path P corresponds to some particular reflection time.

In FIGURE 10 it will also be observed that the wave front W has also been plotted. The wave front, it can be shown (see page 143, section 4.1.1 Seismic Prospecting for Oil by C. Hewitt Dix, copyright 1952 by Harper & Brothers, New York) is also an arc of a circle inasmuch as the wave front by definition intersects all wave paths at points of equal time. The center of curvature of the wave front W is located at point $Cp$ on the vertical or gravitational center line 24 extending downwardly from shot point S. The radial distance $r$ from the center of curvature $Cp$ to the reflector point R is therefore perpendicular to a tangent to the wave front W at reflector point R. It will therefore be observed that the angle between the radial distance line and the vertical line 24 extending downwardly from the shot point S, is dip angle $i$ in FIGURE 10 and represents the inclination of the reflecting surface at the reflector point R. The inclination as represented by the angle $i$ is referred to as dip as hereinbefore indicated. The vertical distance $h$ therefore represents the vertical distance below the shot point S at which the center of curvature of the wave front W is located. Therefore, in order to plot a wave front and a wave path for any given reflection time the datum velocity $V_D$ and the velocity variation characteristic as represented by, $a$, which in this case constitutes the constant rate of change known to those skilled in the science of geology. Then the values for the apparent dip angle $i_0$ and the dip angle $i$ as well as the vertical displacement $h$ of the center of curvature for the wave front and the radius of curvature $r$ of the wave front may be determined for a particular one way time or one-half reflection time as represented by T from the following formulae:

(1) $\tan i/2 = e^{aT} \tan i_0/2$
(2) $h = (V_D/a)(\cos h\, aT - 1)$
(3) $r = (V_{D/a})(\sin h\, aT)$
(4) $\sin i_0 = (V_{d/x})(\Delta T)$ where $x$ is the distance between adjacent shot points (shot point spread) and $\Delta T$ is the time differential or difference between reflection times from each shot point.

The latter formulas which are derived on page 148 of "Seismic Prospecting for Oil" by C. Hewitt Dix previously referred to, may therefore be utilized in order to determine the values necessary to enable one to plot the wave path P and wave front W for any given reflection time. From the foregoing therefore it will be appreciated that a series of wave fronts and wave paths may be plotted corresponding to different reflection times from which the calibrated scale may be derived in accordance with the present invention. It can also be shown that the difference in reflection time from one reflector point taken from adjacent shot points will be proportional to the migration or angular displacement of the one reflector point with respect to each shot point and corresponding wave front.

It will therefore be apparent that by plotting such a series of wave fronts (W) corresponding to different reflection times (T) from any shot point and a series of wave paths (P) corresponding to differential reflection times ($\Delta T$) from spaced shot points, the time measurement data may be utilized to locate a reflector point adjacent to the intersection of the wave front and wave path corresponding to the time measurement. It will therefore be observed from FIGURE 10 that the depth of the reflector point R may be represented by the wave front passing through the point R while the angle Q between straight line path 24' and vertical depth line 24, represents the migrated displacement or migration of the reflector point with respect to the shot point. Accordingly, the intersections of the circular wave fronts with wave paths are located by polar coordinates represented by distance $S_R$ and angle Q having an origin at shot point S. These coordinates may be transposed to rectangular coordinates on a calibration scale so that the intersections of the wave fronts by the wave paths when so transposed on to the rectangular coordinates will be represented by vertical depths with respect to the vertical direction on the rectangular coordinates while the horizontal coordinates to which the wave front intersections are transposed represent the migrated displacement from the origin S corresponding to the angle Q displacement of the reflector point from shot point S relative to the vertical line 24 in FIG. 10. Accordingly, a central vertical reference line on the rectangular coordinates corresponding to angle Q of zero value as shown on the calibrated scale must be aligned with the shot point S on a plotting surface to which the calibrated scale is applied. Also, on the calibrated scale the spacing between the vertical coordinates will represent the angular displacements Q from the vertical reference line 24 in FIGURE 10 and the wave front curves transposed to the vertical coordinates will represent different reflection times and accordingly labeled to indicate the reflection time to which they correspond. Attention is therefore directed to FIGURE 12 wherein a portion of the calibrated scale is shown applied to a plurality of parallel coordinates representing different angles Q previously defined in FIGURE 10. A plurality of wave front curves W' are therefore plotted on these parallel coordinates.

Figure 11:
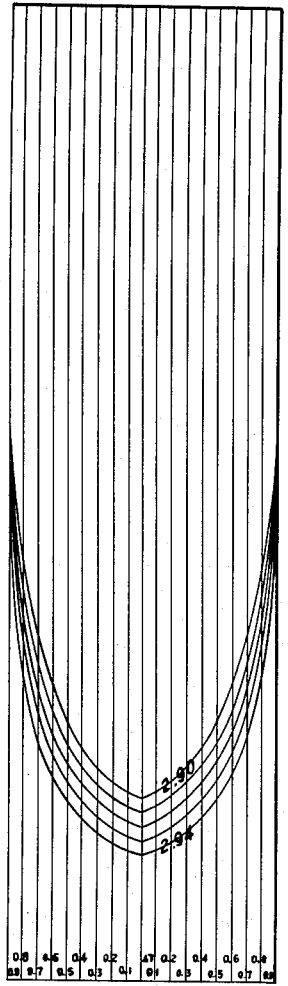
FIGURE 11 illustrates a calibrated scale for use on the plotter apparatus.
Figure 12:
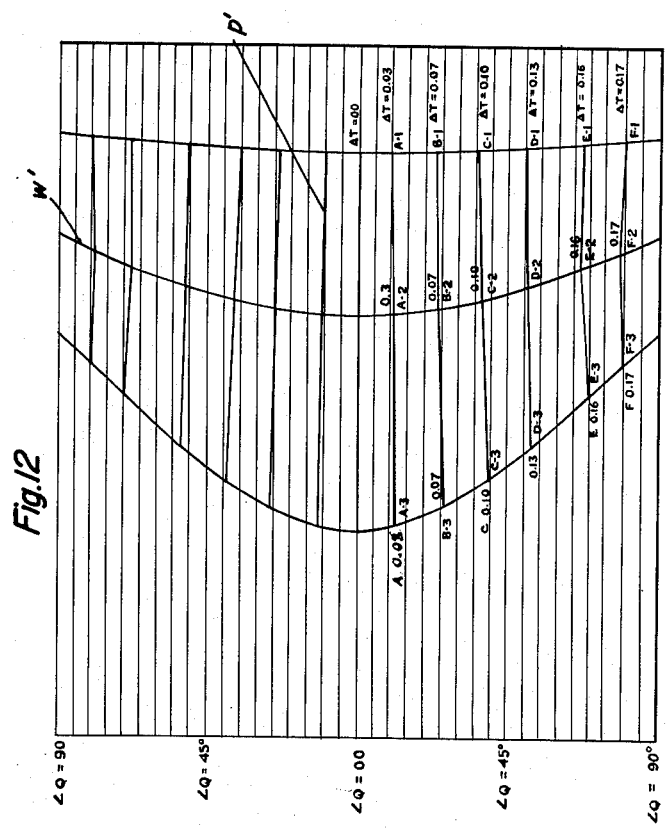
FIGURE 12 illustrates a portion of the calibrated scale.

A plurality of wave paths P as defined in FIGURE 10 are also transposed to the parallel coordinates of the calibrated time scale as seen in FIGURE 12 by determining its angular displacement from the vertical reference line 24 corresponding to different time differential $\Delta T$, by computing the angle Q associated therewith from the geometric relationships defined in FIGURE 10 so that the points of intersection A-1, A-2, A-3, B-1, B-2, etc. of the wave path P' with the wave fronts W' may be plotted on the calibrated scale of FIGURE 12. It will be apparent, of course, that the angle Q associated with each wave path P depends upon its intersection with a different wave front W so that a transposed wave path P' will intersect wave fronts W' at different parallel coordinates. The converted wave paths P' designated by values of $\Delta T$ as 0.03, 0.07, 0.10, 0.13, 0.16 and 0.17 in FIGURE 12, therefore represent the differences in reflection time between shot points from which the angular displacement or migration for each shot point may be plotted since migration is proportional to reflection time differential between the shot points. The converted wave front paths W' on the other hand represent equal reflection time from which the depth of the reflector point may be obtained. Therefore, in utilizing the calibrated scale, intersecting curves W' and P' are printed over the coordinates shown in FIGURE 12. These coordinates representing angular displacement Q, may then be erased so as not to be confused with the curves P' labeled as values of $\Delta T$ in FIGURE 11. The scale is thus mounted with respect to a fixed reference line ($\Delta T$ of zero value) which is pivoted about a shot point plot located on the plotting surface sheet. The reference line is therefore pivoted about a shot point anchor corresponding to movement of the vertical line 24 in FIGURE 10 through an angle Q, while at the same time moving the calibrated scale in appropriate relation to the pivotal movement of the reference line so that the converted P' curve corresponding to the wave path P of FIGURE 10 will be aligned with the vertical coordinate corresponding to line 24' which is angularly related to the line 24 by the angle Q. The intersection of the converted curve W' corresponding to the wave front W of FIGURE 10 with the converted curve P' will thereby locate a point corresponding to the reflector point R angularly displaced from shot point S by angle Q. The reflector point is then marked on the plotting sheet beneath the calibrated scale at the intersection of W' and P' with the pivoting reference line.

Apparatus for effecting the aforementioned conversion of the reflection time data is therefore provided. Referring therefore to FIGURES 2, 3, 4, 5, 6 and 7, it will be observed that a frame member 26 is provided which includes end members 28 and 30. Also connected to the end frame member 30 are a pair of pivot bracket members 32 and 34 by means of which a right angle drive generally indicated by reference numeral 36 is pivotally mounted. The frame 26 is thereby connected to the casing 44 of the right angle drive 36. The right angle drive 36 is pivotally connected to a clamp block generally indicated by reference numeral 38 by means of which the plotter apparatus is anchored to a plotting board 40 which may be mounted at an angle on an easel stand 42 as more clearly seen in FIGURE 2.

Referring to FIGURE 7, it will be observed that the right angle drive 36 includes the casing portion 44 which is connected to the frame 26 as herein before indicated. Rotatably mounted within the casing 44 are a pair of intermeshed beveled gears 36 and 48, bevel gear 46 being connected to a shaft 50 which is fixed against rotation in the clamp 38. The bevel gear 48 is connected to a roller shaft 52 so that upon pivotal movement of the frame 26 with the casing 44 connected thereto about the axis through the fixed shaft 50, gear 48 will be caused to turn an amount equal to twice the angular movement of the frame 26 about the axis of the fixed shaft 50.

Figure 6:
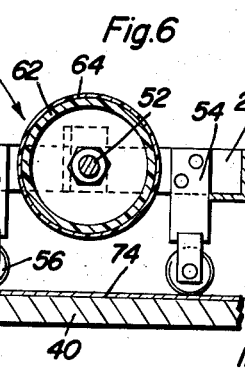
FIGURE 6 is a sectional view taken through a plane indicated by the section line 6—6 in FIGURE 3.

It will therefore be observed that the pivotal movement of the frame 26 is facilitated by means of depending legs 54 which are attached to the end member 28 connected to the frame as more clearly seen in FIGURE 6. A pair of roller wheels 56 are therefore provided at the end of the legs 54 in order to guide the pivotal movement of the frame and plotter mechanism over the plotting surface board 40.

It will also be observed that an elongated drum generally indicated by reference numeral 58 is fixed to the shaft 52 connected to the output bevel gear 48 of the right angle drive 36. Accordingly, pivotal movement of the frame 26 about the axis of fixed shaft 50 will cause rotation of the drum 58 an amount equal to twice the pivotal displacement of the plotter frame 26. The drum is fixed to shaft 52 by means of end members 60 to which an outer cylindrical scale mounting member 62 is connected. Accordingly, the calibrated scale as illustrated in FIGURES 11 and 12 may be applied to the drum cylinder 62, said calibrated scale being designated by reference numeral 64.

Figure 8:
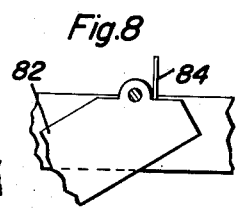
FIGURE 8 is a sectional view taken through a plane indicated by section line 8—8 in FIGURE 4.

It will be observed that the clamp member 38 may thereby anchor the plotter apparatus at any point along a top edge of the plotting board 40 from which anchored point the plotter apparatus may be pivoted as herein before indicated. The clamp device 38 therefore includes an upper block 66 which is hinged by means of hinge 68 to a lower block 70, said blocks having the appropriate recesses therein for clamping upon the upper edge of the plotting board 40. The upper block 66 also has connected thereto an indicator pointer 72 for aligning the plotter apparatus with a shot point located at an upper edge of a calibrated plotting sheet 74. The reference line for the plotter apparatus which constitutes the theoretical line 24 in FIGURE 10 pivoting about the axis of the fixed shaft 50 arranged to correspond to the shot point hereinbefore indicated with respect to FIGURE 10, is determined by a pointer 76 mounted on a plotting head or arm 78 which is fixed to a slide bracket 80 on the plotter frame 26. As more clearly seen in FIGURE 5, an arm is also provided parallel to the arm 78, and a lower arm 82 is disposed beneath the elongated calibrated drum 58 adjacent to the plotting board 40. It will therefore be observed in FIGURES 4 and 8 that a marker 84 is connected to the lower arm 82 for the purpose of locating a reflector point on the plotting sheet 74 mounted on the plotting board 40. It will also be observed with reference to FIGURE 5 in particular, that the slide bracket 80 is slidable along the frame member 26 and yieldably held in an adjusted position by means of a spring mechanism 86. It will also be observed with reference to FIGURES 3 and 9, that an adjustable screw member 88 is provided by means of which a straight edge 90 is pivotally connected to the arm 82 so that the plotter apparatus may be used to connect reflector points located as a result thereof by pivoting the straight edge member 90 relative to the last point located and marked by marker 85 to connect the last located reflector point with the previously located reflector point on the plotting sheet 74.

It will also be observed that the elongated calibrated scale drum 58 which is rotatable with respect to the frame at a predetermined ratio to the pivotal movement of the frame will be in an angularly aligned position relative to the indicator 76 connected to the frame representing a zero angular displacement or migration when the frame is in a central pivotal position as illustrated in FIGURE 3. It will also be observed in FIGURE 3 that a spring 92 is provided between the frame pivot bracket 32 and the drum 58 in order to bias the drum 58 toward its angularly aligned zero migrated position.

In FIGURES 14, 15, 16 and 17 an alternative form of plotting apparatus is illustrated. The latter form of apparatus is similar to the previously described apparatus but it differs therefrom in the drive mechanism which relates the pivotal movement of the plotter to the angular displacement of the calibrated scale. Accordingly, the clamp device 38 as seen in FIGURE 15 has connected thereto the friction board 94 to which the shot point locator 96 is connected. Accordingly, when the frame generally indicated by the reference numeral 98 is pivoted about an axis through the pivot mounting 100 for the frame 98, the friction wheel 102 connected to the shaft 104 will be rotated at a predetermined relation or ratio to the pivotal movement of the frame assembly 98 by virtue of its frictional engagement with the friction board 94. The ratio may be varied by axially adjusting the position of the friction wheel 102 on the shaft 104 to which it may be connected in any suitable manner such as by set screw 103.

Figure 16:
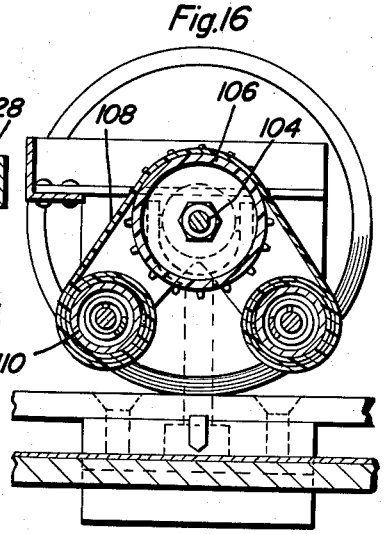
FIGURE 16 is a sectional view taken through a plane indicated by section line 16—16 of FIGURE 14.
Figure 17:
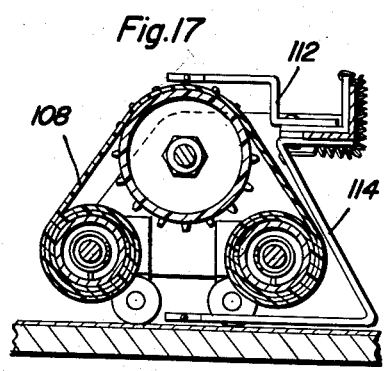
FIGURE 17 is a sectional view taken through a plane indicated by section line 17—17 of FIGURE 14.

The shaft 104 as more clearly seen in FIGURE 16 has connected thereto a pair of sprocket wheels 106. Accordingly, the calibrated scale is moved relative to the reference indicator 76 by means of sprocket holes at the upper and lower ends thereof which engage the sprocket teeth on the wheels 106, the calibrated scale identified by reference numeral 108 being wound and unwound upon a pair of oppositely spring-tensioned spools 110 rotatably mounted by the frame assembly 98 on either side and below the sprocket wheel 106 to hold the scale sheet 108 taut on the sprocket roller 106. It will therefore be appreciated that by pivotally moving the frame assembly 98 the calibrated scale sheet 108 will be moved relative to the reference indicator. Accordingly, the plotter may be used in a manner similar to the first described form. In this latter form however, there is leeway in the drive ratio between the pivotal movement of the frame assembly and the movement of the calibrated scale relative thereto, and hence the plotting sheet with which the plotter cooperates to mark the reflector points for profile information would have to be calibrated to correspond to the particular drive ratio being employed. It will also be noted in connection with this latter form of plotter that the slide bracket 112 is similar to the slide bracket 80 while the lower portion 114 thereof differs from the previous arrangement in order to accommodate the different mounting of the calibrated scale 108 as will be more clearly seen in FIGURE 17.

Figure 13:
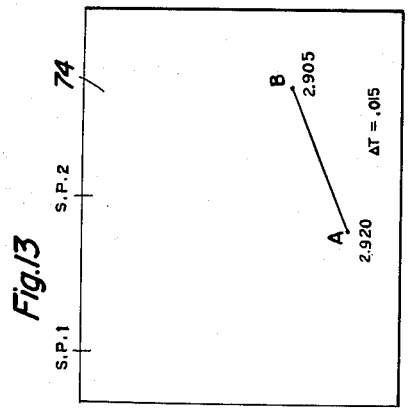
FIGURE 13 illustrates the plotting sheet as used in conjunction with the plotter apparatus.

Operation and use of the plotter will be as follows: Let it be assumed that reflection time measurement were taken from two shot points with the reflection time from shot point No. 1 being 2.920 seconds while the reflection time from shot point No. 2 is 2.905 seconds. Referring therefore to the use of the plotter mechanism illustrated in FIGURES 3 through 9, and referring to FIGURE 13 it will be observed that the plotting sheet 74 with the two shot points 1 and 2 located thereon will be mounted on the plotting board 40 which is calibrated by means of a scale 116 so as to enable one to read the distances off the plotting sheet 74. The slide clamp device 38 of the plotter is therefore released from the edge of the plotter board 40 and slid therealong until the shot point indicator 72 is aligned over the shot point No. 1. The frame assembly 26 of the plotter is then swung about its pivot axis through the fixed shaft 50 until the P' curve corresponding to the time differential between the reflection times, namely .015 second as seen in FIGURE 13 appears below the indicator 76. The indicator 76 is then slid along the frame 26 until it is aligned with the intersection of the W' curve corresponding to 2.920 seconds reflection time with the P' curve having a ΔT value of .015. Pivotal manipulation of the plotter and a sliding manipulation of the reference indicator 76 will therefore be required until the reference indicator 76 is aligned with the intersection of the P' and W' curves corresponding to .015 second and 2.920 seconds, respectively. At such point therefore the reflector point to which the time measurements relate will have been located whereupon a reference point A may be marked by the locational marker 84. After the shot point indicator 72 is aligned with shot point 2 by means of clamp 38, a second reflector point B is then located in a similar manner at the pivotal position of the frame 26 necessary to align the indicator 76 with the intersection of P′ curve at a ΔT value of .015 second with the W′ curve of a reflection time value of 2.905 seconds. Accordingly, as seen in FIGURE 13 the two reflector points are plotted on the plotting sheet 74 and are interconnected by use of the straight edge 90, the second reflector point B being located following the location of the reflector point A. It will therefore be appreciated that a plurality of reflector points may be plotted on the plotting sheet 74 from reflection time data taken at various shot points located at the upper edge of the plotting sheet 74. Accordingly, a reflector surface profile may be determined by connecting the plotted reflector points.

From the foregoing description, it will therefore be appreciated that the plotter apparatus made in accordance with this invention is both easy to use and accurate to a greater degree than was heretofore possible by use of previous conversion mechanisms. It will also be appreciated that the calibrated scale mounted on the pivotal frame movable with respect thereto may be calibrated pursuant to various velocity characteristics of sound wave transmission through the subsurface of the earth so as to provide a profile plot with any degree of accuracy desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Apparatus for plotting subsurface bed profiles comprising, flat profile plotting surface means, plotter means selectively anchored for pivotal movement about shot points plotted on said plotting surface means, calibrator means mounted on said plotter means and movable relative to said plotter means in response to pivotal movement of said plotter means about a plotted shot point, locator means mounted on said plotter means and adjustably movable relative to said plotter means for intersection of the calibrator means at a location thereon corresponding solely to reflection time measurement data to locate a reflector point at a pivotal position of the plotter means relative to a plotted shot point and adjustable position of the locator means relative to the plotter means at said pivotal position necessary to obtain said intersection with the calibrator means, clamp means removably anchored at plotted shot point on said plotting surface means, said plotter means comprising elongated frame means pivotally connected to said clamp means, said calibrator means comprising elongated drum means rotatably mounted on said frame means and drivingly connected for rotation about its own axis for exposing intersecting time plotted curves continuously movable with respect to the locator means in response to pivotal movement means in response to pivotal movement of the frame means relative to the clamp means at a predetermined ratio corresponding to the calibration of the plotting surface means, wherein said calibrator means further including replaceable scale means mounted on the drum means for mounting said intersecting time plotted curves, said curves comprising lines of equal reflection time intersecting lines of equal shot time differentials.

2. The apparatus as defined in claim 1, wherein said locator means comprises indicator means slidably mounted on said frame means for locating intersections of said intersecting lines on the scale means of the calibrator means and a marker connected to said indicator means and disposed adjacent to the plotting surface means for plotting reflector points thereon corresponding to relative positions of said indicator means, frame means and scale means with respect to the plotting surface means.

3. The apparatus as defined in claim 2, including adjustable straight-edge means pivotally connected to said marker for connecting reflector points plotted on said plotting surface means.

4. The apparatus as defined in claim 3, wherein the calibrator means includes right-angle drive means mounted on said frame means and including engaging gear means with one of said gear means being fixed to said clamp means and another of said gear means connected to said drum means.

5. Apparatus for plotting subsurface reflector points comprising a flat profile plotting surface means, clamp means removably anchored at selected shot points plotted on the surface means, elongated frame means pivotally connected to said clamp means, elongated roller means rotatably mounted on said frame means and drivingly connected to said clamp means by gear means for rotation of said roller means about its own axis in response to pivotal movement of said frame means, calibrated scale means defining lines of equal reflection time intersecting lines of equal shot time differentials operatively connected to said roller means for continuous movement relative to the frame means in response to pivotal movement thereof and reflector plotting means slidably mounted on said frame means for locating reflector points on the surface means when aligned with intersections of said lines on the scale means corresponding to reflection time measurement data taken at the selected shot points.

6. The apparatus as defined in claim 5, wherein said scale means includes flat sheet means containing said intersecting lines and engageable with said roller means for movement of the sheet means relative to the frame means and reflector plotting means.

7. A seismic data plotter comprising a plotting head, means mounting said plotting head for rotation of a point fixed thereon around a fixed reference point in arcs of selectively adjustable radius, means providing a seismic time scale extending along said adjustable radius for intersection by the plotting head and having intersecting curves displaceable with respect to said point on the plotting head, means providing for selective radial adjustment of said plotting head and point thereon along said mounting means relative to said time scale, and means for displacing said time scale relative to the plotting head in a direction intersecting said radial adjustment in response to rotation of said mounting means.

8. A seismic data plotter comprising means providing a single seismic time scale having a zero reference line adapted to be aligned with a zero point in a position representative of a vertical direction therefrom in the earth, a plotting head, means mounting said plotting head for rotation of a locating point thereon around said zero point in arcs of selectively adjustable radius with said locating point on the plotting head, being for all positions of said plotting head, on a line extending from said zero point parallel to said reference line, means for movably displacing said time scale and reference line relative to the plotting head in response to rotation of the plotting head by the mounting means, and means providing for selective movement of the plotting head relative to the mounting means.

9. A seismic data plotter for plotting the location and dip of a reflecting interface comprising means providing a seismic time scale with reflection time curves representative of the paths of energy emanating from the point of origin of a seismic disturbance, a plotting head including means for indicating the location and dip of a reflecting interface, means mounting said plotting head for rotation about said point of origin in arcs of adjustable radius, means for selectively positioning said plotting head relative to said time scale for alignment of a locating point fixed on the plotting head with intersections of said reflection time curves with differential time curves on the time scale representative of wave fronts corresponding to said energy paths, and means providing for displacement of the time scale relative to the plotting head in response to rotation thereof by the mounting means.

10. Apparatus for plotting subsurface bed profiles comprising, plotting surface means, plotter frame means selectively anchored to the plotting surface means for angular displacement about a selected anchor point representing the origin of radiant energy, calibrated scale means movably mounted on the plotter frame means having different time curves thereon representing the paths of energy emanating from said origin and reflection time curves representing wave fronts intersecting said paths of energy at various distances from the origin, locator means movably mounted on the plotter frame means or radial movement with respect to said selected anchor point to locate intersections on a selected differential time curve and means responsive to said angular displacement of the plotted frame means for imparting movement to the calibrated scale means at a predetermined ratio angularly displacing the differential time curves relative to the selected anchor point, whereby the intersection of a selected differential time curve with the selected reflection time curve may be aligned with the locator means to record points on the surface means forming the subsurface profile being plotted.

11. A method of converting energy travel time measurements from selected points of origin into plots of energy reflecting surfaces comprising the steps of: transposing a wave-front chart to rectangular coordinates, said transposed wave-front chart having a first series of curves representative of the seismic wave at particular times after emanation of said seismic wave from a shot point and a second series of curves representative of the time differentials associated with reflecting surfaces, said first series and second series of curves intersecting one another; displacing a locator in a linear direction parallel to a zero time differential curve on the transposed wave-front chart to trace one of the curves of said first series representative of each wave travel time measurement taken; angularly displacing the locator simultaneously about anchor points representative of the shot points from which each of said travel time measurements were taken and by amounts representative of time differentials between time measurements; displacing the transposed wave-front chart relative to the locator in a direction perpendicular to said linear displacement of the locator in proportion to migration of the reflecting surfaces from the shot points represented by the amount of said angular displacements of the locator to align the locator with the intersections of each one of said curves of the first series with an intersecting curve of said second series corresponding to each of said time differential measurements; and interconnecting points recorded by the locator when aligned with said intersections to plot the slope and migration of reflecting surfaces with respect to the shot points from which the travel time measurements were taken.

References Cited in the file of this patent

UNITED STATES PATENTS

| | | |
|---|---|---|
| 2,535,220 | McGuckin | Dec. 26, 1950 |
| 2,817,905 | Richert | Dec. 31, 1957 |
| 2,842,849 | Amery | July 15, 1958 |
| 2,880,510 | Sisson | Apr. 7, 1959 |